Feb. 7, 1933.   R. CHILTON   1,896,222
ENGINE COWLING
Filed Dec. 12, 1930   3 Sheets-Sheet 1
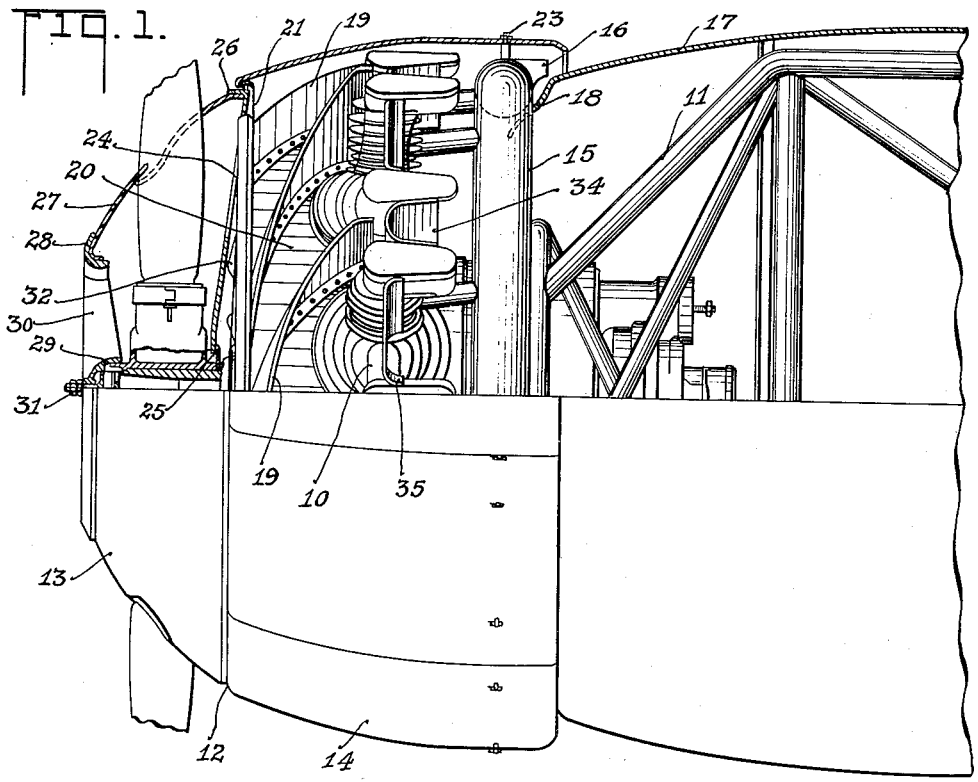
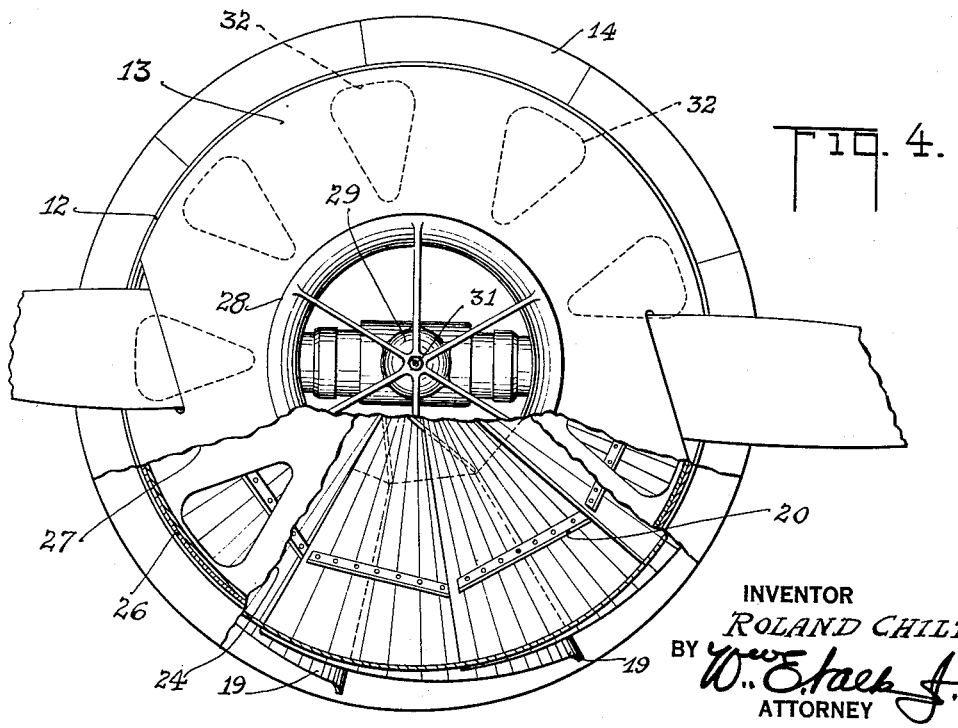
INVENTOR
ROLAND CHILTON
BY
ATTORNEY Feb. 7, 1933.   R. CHILTON   1,896,222
ENGINE COWLING
Filed Dec. 12, 1930   3 Sheets-Sheet 2

INVENTOR
ROLAND CHILTON
BY
ATTORNEY

Feb. 7, 1933.  R. CHILTON  1,896,222
ENGINE COWLING
Filed Dec. 12, 1930  3 Sheets-Sheet 3

INVENTOR
ROLAND CHILTON
BY
ATTORNEY

Patented Feb. 7, 1933

1,896,222

UNITED STATES PATENT OFFICE

ROLAND CHILTON, OF RIDGEWOOD, NEW JERSEY, ASSIGNOR TO WRIGHT AERONAUTICAL CORPORATION, OF PATERSON, NEW JERSEY, A CORPORATION OF NEW YORK

ENGINE COWLING

Application filed December 12, 1930. Serial No. 501,789.

This invention relates to engine cowling in general and more specifically to new and improved means for cowling and cooling air-cooled radial aircraft engines.

One object of the invention is to provide a cowling for completely enclosing an engine so as to comprise with the fuselage or nacelle of the airplane a complete streamline body.

Another object of the invention is to eliminate the drag and interference with engine cooling caused by the large disturbance of the air flow set up by the exposed propeller hubs of the prior art.

Another object of the invention is to substantially increase the velocity of the cooling air over the engine cooling means. In fact, by the provisions of this invention, the velocity of the cooling air over the engine cooling means may be much greater than the velocity of flight or the velocity of the slipstream from the propeller.

Another object of the invention is to confine the air flow under the cowl to the finned periphery of the engine, thus reducing the total cross-sectional area of the cooling stream required, an associated object being a corresponding reduction in the area of the entrance and exhaust openings in the cowl.

Another object is to provide an improved spinner construction adapted to withstand the high centrifugal stresses resulting from greatly increased spinner diameters.

Further objects are to provide a spinner which shall be large enough to completely enclose the propeller hub and the roots of the propeller blades and which is rigidly secured in accurately centered relation for rotation with the propeller and yet may be quickly assembled about the propeller blades altho the openings for the blades afford a minimum of clearance.

Radial air-cooled engine cowlings of the prior art comprise fixed rings having an entrance opening just behind the propeller and providing at the rear a relatively wide exhaust slot between the trailing edge of the cowling and the fuselage of the airplane.

The hubs, and the roots of the blades, of airplane propellers are relatively bulky so that in practice there is no useful pitched section towards the center of the propeller. This results in a powerful radial displacement of the central portion of the air stream which is diverted outwardly so that the flow is at an angle to the cylinder fins, the bases of which are thus shielded from the cooling air.

So powerful is this radial displacement that the flow has, in certain cases, been observed to be into the center of the propeller from both the front and the rear, the direction of flow over the engine nose being actually reversed, which is naturally very detrimental to cooling. An additional object of the present invention is to provide means to utilize this centrifugal displacement to induce an augmented and parallel cooling air stream over the engine cylinders.

It will be appreciated that owing to the large masking effect of the normally exposed propeller hubs and blade roots, the entrance diameter of an ordinary fixed cowl must be much greater than the theoretical requirements. The deficiency of the cowling from perfect streamline form is determined by the diameter necessary in the entrance hole and a drastic reduction in the required diameter is a further object of this invention.

Accordingly, the profile of the cowling of this invention comprises the nose of a streamline body embracing the engine and propeller hub so that only the pitched part of the propeller blades extend thru the cowling, the front portion of which is mounted on the propeller for rotation as a spinner. This rotating spinner is provided with a relatively small entrance hole ahead of the propeller where it is unaffected by disturbances from the hub, and has a back-plate immediately behind the propeller provided with outlet ports toward its periphery.

It will be seen that the propeller hub and blade roots comprise a diametral partition inside this large hollow spinner which will cause the contained air to rotate with the spinner, the whole comprising, in effect, a centrifugal blower. In a typical instance the tangential velocity of the spinner at the delivery ports would be twice the flight velocity of the airplane. The air issuing from the ports at this augmented tangential velocity is collected by fixed curved vanes inside the fixed portion of the cowling, and directed toward the cylinder fins whereby the cooling air velocity is greatly increased from the normally available propeller slipstream velocity.

In the drawings Fig. 1 is a longitudinal section of an engine and its mounting with the cowling of this invention partly cut away to show the fixed guide vanes and certain other details.

Fig. 4 is an end view with the cowling partly cut away to illustrate diagrammatically the fixed guide vanes.

Figure 2:
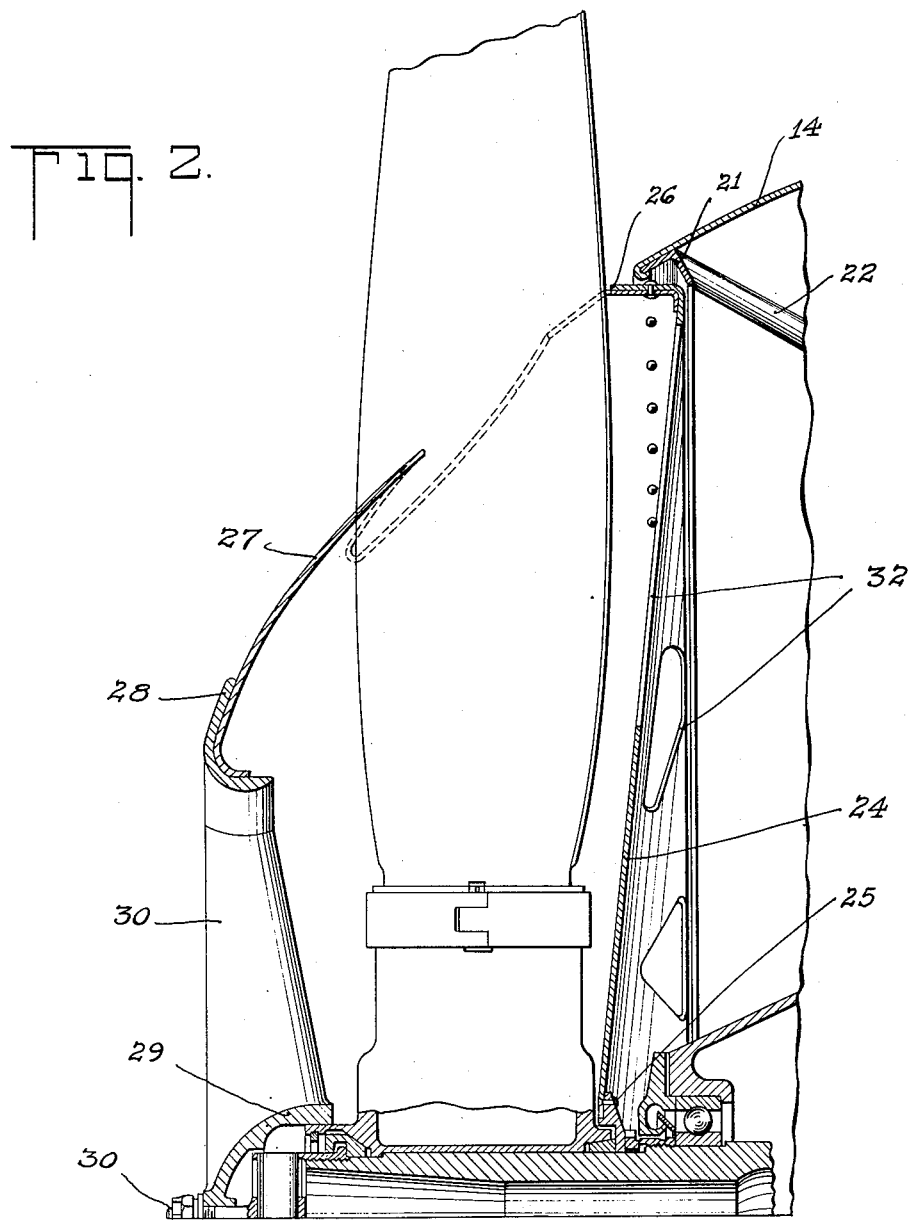
Fig. 2 is a sectional view of larger scale, thru one-half of the spinner showing the construction of this member.

Referring first to Fig. 1, the engine has cylinders 10 and is secured to an engine mounting 11 in the usual way. The line 12 indicates the division between the rotating spinner 13 and the fixed part of the cowling 14. 15 represents an exhaust collector having outlets 16 directed into the slot between the rear of the fixed cowl 14 and the fuselage cowling 17, which is preferably inturned at 18 to provide a space for air flow over the exhaust collector. The fixed guide vanes comprise curved sheets 19 secured in front of the engine and terminating close to the back-plate of the spinner at an angle conformed to the direction of air flow so as to shocklessly divert the air to axial flow over the cylinders. For clearness these guide vanes have been shaded and they are preferably provided with intermediate partitions 20, also shown in Fig. 4 in end view. These partitions act as straighteners to prevent radial flow which might set up eddies. The curved radial vanes 19 preferably extend out to the fixed part of the cowling 14.

Referring now to Fig. 2, an angle section ring 21 is suitably secured to the engine as by arms 22 and this ring serves to support the front end of the fixed cowling sheets 14, the rear end of which may be conveniently separated from the exhaust collector as indicated at 23 (Fig. 1). The spinner consists of a dished back-plate 24 rigidly secured to the propeller hub at 25 and having a forwardly turned flange 26 having a running clearance under the supporting ring 21. 27 is the spinner proper, curved to provide a complete streamline form with the fixed cowling 14 and having suitable slots to accommodate the propeller blades. The nose piece comprises a ring 28 engaging the front opening in the spinner and a hub 29 fitted to the propeller hub, these elements being united by spokes 30. A draw bolt 31 engages the propeller hub and permits the entire spinner assembly to be drawn firmly together, the dishing of the back-plate giving it rigidity to sustain the screwing-up load.

In Figs. 4 and 2, 32 indicates the outlet ports disposed at the outer part of the back-plate. It will be noted that for purposes of assembly the slots thru the spinner 27 must be open at the rear of this member which would greatly weaken the structure against centrifugal force but for the support given by the continuous rim 26 of the back-plate 24 which surrounds the back-end of the spinner and restrains it against expansion. If desired, an auxiliary ring (not shown) may obviously be added to increase the bursting strength at this point.

Figure 3:
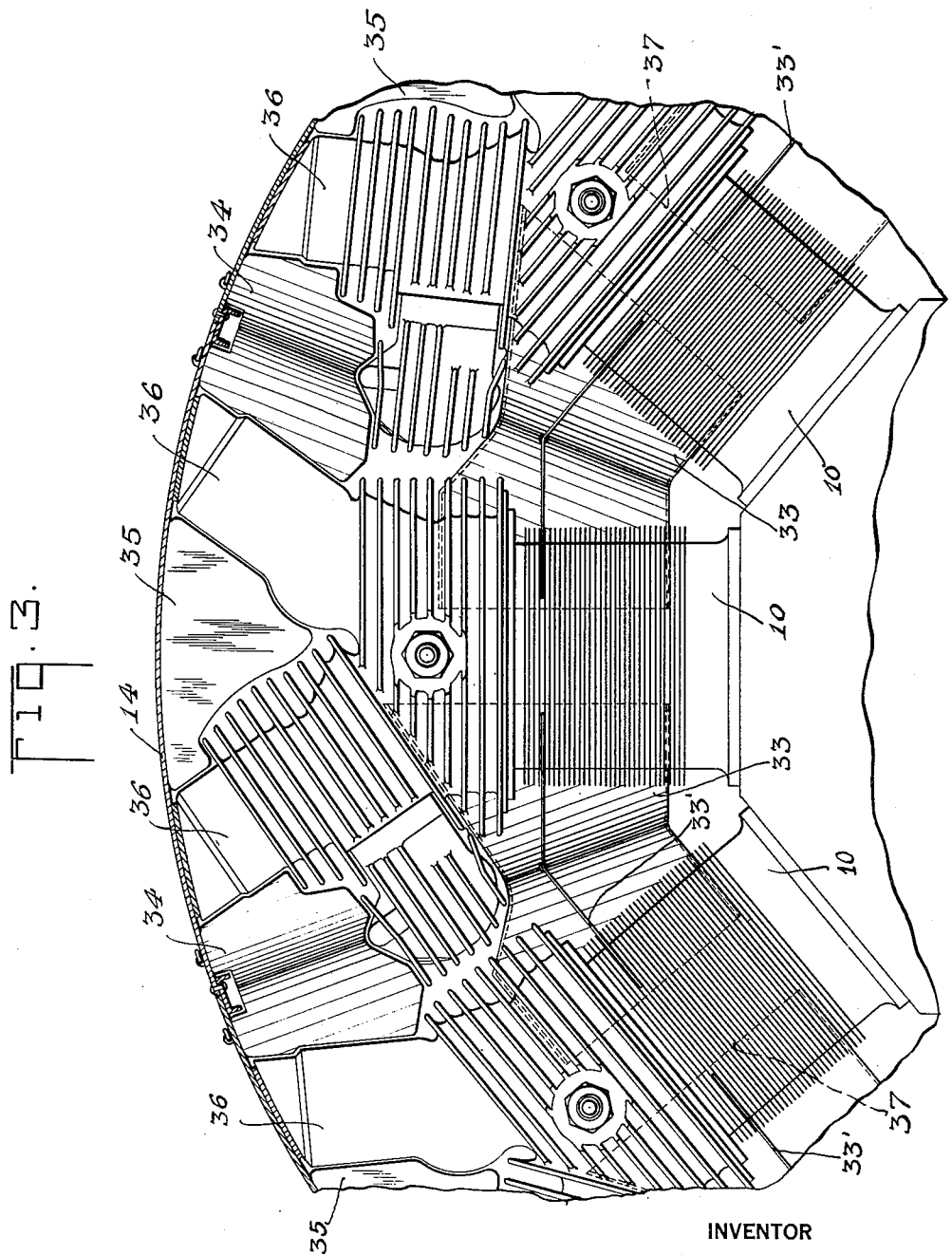
Fig. 3 is a fragmentary end view showing a few of the engine cylinders to illustrate the baffles by which the air flow is constrained to the cooling fins.

In Fig. 3, 33 designates baffles secured between and behind the cylinder barrels in order to prevent wasted air flow in the intercylinder spaces, while further baffles 34 and 35 are secured to the fixed cowling 14 to block off the unfinned spaces between the rocker boxes 36 of the cylinders 10. Preferably the baffles 33 are provided with flanged extensions 33' which engage between the cylinder fins and by such engagement are rearwardly tho rigidly held in place. By extending the baffles 33 around and behind the cylinders as indicated in Fig. 3, leaving a space 36 between adjacent baffles for the escape of air, the cylinders 10 are cooled much more satisfactorily.

The operation of the device is as follows: The spinner rotating at high speed with the propeller and being virtually divided into two compartments by the roots of the propeller blades enforces unitary rotation upon the contained air. The peripheral velocity being very high (in general over 200 miles per hour) relatively large centrifugal force is set up on the air which accordingly issues from the outlet ports 32 at high velocity. The angle of the front end of the curved guide vanes 19 is intended to conform with the angle of flow of the air from the exit ports and the guide vanes and the baffles cooperate to distribute this air at substantially undiminished velocity over the fins of the engine cylinders. The air issues from the stationary cowling at the rear exit slot previously described.

It will be seen that by the provisions of this invention the objectionable centrifugal displacement generated by the roots of the blades of a normal naked propeller has been utilized to augment the velocity of the cooling air stream. It should also be noted that this centrifugal displacement of air by naked propeller hubs also interferes with the air flow over any streamline body placed behind the hub, it having been demonstrated that the most efficient form is that in which only the pitched parts of the propeller blades project from the nose of the streamline.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. The combination with a propeller driven by an engine, of a hollow spinner rotatable with the propeller and provided with an axial air entrance ahead of the hub of said propeller and with discharge ports at the back of said spinner disposed at a greater radius than that of said entrance, and fixed means cooperating with said ports to direct the air discharging therefrom upon the cylinders of the engine.

2. A streamline cowling for an airplane engine having a propeller comprising, in combination, a fixed portion surrounding the engine and a rotating portion from which the pitched extremities of the propeller project, said rotating portion having an axial entrance opening at the nose and circumferential discharge ports at the rear, and means in said fixed cowl to collect air issuing from said ports and direct such air over the parts of the engine to be cooled.

3. A cooling air blower for an engine having a propeller comprising, in combination, a hollow conical spinner from which the pitched portion of the propeller blades project, said spinner being provided at the front with an axial air entrance opening and at the rear with circumferential air exit ports, and fixed guide vanes adapted to collect the air issuing from said ports and to direct such air over the cylinders of the engine.

4. The combination with an engine having a propeller, of a cooling air blower comprising a hollow conical casing covering the central portion of said propeller and adapted for the tangential delivery of air thru ports in the base of said cone, and fixed means cooperating with said ports to direct such air for cooling the engine.

5. A cowling and cooling means for an engine having a propeller comprising a spinner having an axial air inlet ahead of said propeller and circumferential delivery ports behind said propeller, fixed cowling comprising with said spinner a streamline enclosure for the engine and for the hub of said propeller respectively, and guide vanes in said fixed cowl adapted to lead the air from said delivery ports to said engine.

6. In an engine having a rotary propeller, a hollow spinner having an axial air entrance opening ahead of said propeller and circumferential delivery ports behind said propeller, the whole adapted to act centrifugally to impress a high velocity flow of cooling air thru the spinner.

7. In an engine having a rotary propeller and heat radiating means, a hollow spinner having an axial air entrance ahead of said propeller and circumferential delivery ports behind said propeller, the whole adapted to act centrifugally to impress a high velocity on the contained air, and fixed means adapted to deliver said air over said radiating means.

8. The combination with an engine having radiating means and a normal air propeller tending to displace air centrifugally from the hub, of means to utilize said centrifugal action to augment the cooling air flow including a hollow spinner rotatable with the propeller, and fixed vanes for guiding the air issuing from said spinner over the radiating means of the engine.

9. A spinner for a propeller having a hub comprising, in combination, a back-plate secured to the rear of the propeller hub and having a forwardly turned rim, a nose piece comprising a hub and rim united by arms, a conical surface member engaged under and between the rims of the back-plate and nose piece respectively, and a draw bolt means engaging the propeller hub to draw the parts into assembled relation.

10. A spinner for a propeller having a hub comprising, in combination, a plate secured to the rear of the propeller hub and having a forwardly turned rim, a nose piece comprising a hub and a rim united by arms, a conical surface member engaged under and between the rims of the back-plate and nose piece respectively, and means engaging the propeller hub to draw the parts into assembled relation, said back-plate having circumferential air outlet ports.

11. A spinner for a propeller having a hub comprising, in combination, a back-plate secured to said hub and having a forwardly turned cylindrical rim, a conical surface member fitted at its base into said rim and having an axial opening, a spoked nose piece engaging the spinner at said opening and provided with a hub engaging the propeller hub, and screw means engaging said hubs and adapted to draw the parts together to clamp the conical member firmly between the back-plate and the nose piece.

12. A spinner for a propeller having a hub comprising, in combination, a back-plate secured to said hub and having a forwardly turned cylindrical rim, a conical surface member fitted at its base into said rim and having an axial opening, a spoked nose piece engaging the spinner about said opening and provided with a hub engaging the propeller hub, and means adapted to draw said hubs together to clamp the conical member firmly between the back-plate and the nose piece in a detachable manner.

13. The combination with a propeller having a hub, of a spinner comprising a backplate secured to the hub and having a forwardly turned rim, a coned spinner member slotted for assembly over the propeller blades and engaged at its base in said forwardly turned rim, a spoked nose piece engaged with the nose of the spinner and defining an axial air inlet thereto, and a draw bolt engaging the hub and the nose piece for detachably clamping the parts in assembled relation.

14. A cooling air blower for an engine having a propeller comprising a shell of truncated conical form rotatable with the propeller and provided with circumferential air outlet ports in the base of the cone, and means including the central part of the propeller to constrain air passing thru the shell to rotate therewith prior to its escape therefrom thru said outlet ports.

15. A cowling and cooling means for radial cylinder air-cooled engines of aircraft including a cowl ring encircling the engine and open at its forward end to admit of the passage therethru of a cooling blast of air, and means extending forwardly of the engine cylinders within said cowl ring for guiding and directing the air stream toward said cylinders, said means being disposed at an angle conforming to the direction of floor of said air stream.

16. A cowling and cooling means for an engine having a propeller including, in combination, a spinner having an axial air inlet ahead of said propeller and circumferential delivery ports behind said propeller, fixed cowling comprising with said spinner a streamline enclosure for the engine and for the hub of said propeller respectively, and a guide vane for each delivery port disposed within said fixed cowling for directing the cooling air from said delivery ports to said engine, each of said vanes being disposed at an angle conforming to the direction of the air stream flow.

17. The combination with a propeller driven by an engine, of a hollow spinner rotatable with the propeller and provided with an axial air inlet opening and with discharge ports disposed at a greater radius than the radius of said air inlet opening, the air inlet opening and the discharge ports being formed within said spinner respectively ahead of and to the rear of the hub of said propeller.

18. A streamline cowling for an aeroplane engine having a propeller comprising, in combination, a fixed part surrounding the engine and a rotatable part from which the pitched extremities of the propeller project, said rotatable part having formed therein in advance of the propeller hub an axial air inlet opening and having formed therein intermediately of said hub and said fixed part a plurality of discharge ports from which the air acted upon by the encased portion of the propeller is adapted to escape.

19. A cooling air blower for an engine having a propeller comprising a hollow conical spinner from which the pitched portions of the propeller blades project, said spinner being provided in advance of the propeller with an axial air inlet opening and at the rear of the propeller with a back plate having formed therein a plurality of circumferentially disposed air exit ports.

20. The combination with a radial cylinder air-cooled engine having a propeller, of an air blower comprising a hollow spinner cooperating with the roots of the propeller blades to impress unitary rotation upon the air in said spinner so as to force the air therethru by the centrifugal force thus set up, and fixed means fitting within the inter-cylinder spaces for directing the air stream from said blower around and behind the rear walls of the engine cylinders.

21. A cooling and cowling means for an engine having a propeller including, in combination, a spinner having an air inlet opening ahead of the propeller hub and circumferentially disposed air exit openings behind said propeller, fixed cowling forming with said spinner a streamline enclosure for the engine and the hub of the propeller, and means within said fixed cowling for directing the air passing thru said spinner toward and over the engine parts required to be air-cooled.

22. In aircraft, the combination with an engine and a propeller, of cowling within which the hub of the propeller and the engine is enclosed, said cowling comprising a part fixed in its relation to the aircraft and a part rotatable with the propeller, said rotatable part having formed therein at its forward end an air inlet opening, said fixed part having formed therein an opening thru which the air escapes, and said fixed part having mounted therein a plurality of air deflectors by means of which the air, prior to its escape from said fixed part, is directed toward and over the parts of the engine required to be air-cooled.

23. In aircraft, the combination with a radial cylinder air-cooled engine and a propeller, of a blower including a spinner within which the hub of the propeller is encased, fixed cowling within which the engine is encased, said fixed cowling, at its forward end, being open and said blower being so related to said fixed cowling as to direct thereinto a cooling blast of air, and means within said fixed cowling for guiding and directing said stream of air toward and over the engine parts required to be air-cooled.

In testimony whereof I hereunto affix my signature.

ROLAND CHILTON.